(12) United States Patent
Shaw

(10) Patent No.: US 7,707,018 B2
(45) Date of Patent: Apr. 27, 2010

(54) FINITE VOLUME METHOD SYSTEM AND PROGRAM STORAGE DEVICE FOR LINEAR ELASTICITY INVOLVING COUPLED STRESS AND FLOW IN A RESERVOIR SIMULATOR

(75) Inventor: Gareth Shaw, Sutton Courtenay (GB)

(73) Assignee: Schlumberger Technology Corporation, Houston, TX (US)

( * ) Notice: Subject to any disclaimer, the term of this patent is extended or adjusted under 35 U.S.C. 154(b) by 827 days.

(21) Appl. No.: 11/295,329

(22) Filed: Dec. 5, 2005

(65) Prior Publication Data

US 2006/0129366 A1   Jun. 15, 2006

Related U.S. Application Data

(60) Provisional application No. 60/635,866, filed on Dec. 14, 2004.

(51) Int. Cl.
   *G06G 7/48* (2006.01)
(52) U.S. Cl. ........................................ 703/10
(58) Field of Classification Search .................... 703/10
   See application file for complete search history.

(56) References Cited

U.S. PATENT DOCUMENTS

| | | | |
|---|---|---|---|
| 6,230,101 B1 | 5/2001 | Wallis | |
| 6,766,255 B2 * | 7/2004 | Stone | 702/13 |
| 2004/0199329 A1 * | 10/2004 | Stone | 702/13 |

OTHER PUBLICATIONS

Liu et al., SPE Asia Pacific Oil and Gas Conference and Exhibition, Oct. 18-20, 2004, Perth, Australia, Coupled Stress and Fluid Flow Using a Finite Element Method in a Commercial Reservoir Simulator., pp. 1-11.*

SPE 93430 "Finite Volume Methods for Coupled Stress/Fluid Flow in a Commercial Reservoir Simulator" Jan. 31, 2005.

Stone, et al for "Fully Coupled Geomechanics in a Commercial Reservoir Simulator". SPE 65107, presented at the SPE Europec 2000 Petroleum Conference, Oct. 2000.

Stone, et al. for "Coupled Geomechanical Simulation of Stress Dependent Reservoirs", SPE 79697, presented at the SPE Reservoir Simulation Symposium, Feb. 2003.

Liu, et al. for "Coupled Stress and Fluid Flow Using a Finite Element Method in a Commercial Reservoir Simulator", SPE 88616, presented at the SPE Asia Pacific Oil and Gas Conference in Perth, Australia, Oct. 2004.

Peyret, et al. for "Computational Methods for Fluid Flow", Springer Verlag, Berlin, 1983.

Jameson, et al. for 'Numerical Solutions of the Euler Equations by Finite Volume Methods Using Runge-Kutta Time Stepping Schemes, AIAA Paper 81-1259, 1981.

(Continued)

*Primary Examiner*—Paul L Rodriguez
*Assistant Examiner*—Eunhee Kim

(57) ABSTRACT

A method for conducting a stress calculation is disclosed adapted for modeling a set of stresses and displacements in a reservoir, the method comprising: (a) building a reservoir model over a region of interest by gridding the region of interest, the grid being comprised of one or more cells and having nodes, each cell having a cell center; (b) interpolating unknown rock displacements in the region of interest from cell centers to grid nodes; (c) integrating over each cell to form a discrete system of equations; and (d) using the discrete system of equations to model the stresses and displacements in the reservoir.

16 Claims, 11 Drawing Sheets

OTHER PUBLICATIONS

Crumpton, et al. for "Cell Vertex Finite Volume Discretizations in Three Dimensions", International Journal for Numerical Methods in Fluids, vol. 14, 505-527, 1992.

Rozon for "A Generalized Finite Volume Discretization Method for Reservoir Simulation", SPE 18414, presented at the Reservoir Simulation Symposium in Houston, Texas, Feb. 6-8, 1989.

Crumpton, et al. for "Discretisation and Multigrid Solution of Elliptic Equations With Mixed Derivative Terms and Strongly Discontinuous Coefficients", Journal of Computational Physics 116, 343-358, 1995.

Demirdzic, et al. for "Finite Volume Method for Stress Analysis in Complex Domains", International Journal for Numerical Methods in Engineering, vol. 37, 3751-3766, 1994.

Demirdzic, et al. for "Finite Volume Method for Thermo-Elasto-Plastic Stress Analysis" Computer Methods in Applied Mechanics and Engineering, vol. 109, 331-349, 1993.

Stuben for "SAMG User'S Manual", Fraunhofer Institute SCAI, Schloss Birlinghoven, D-53754 St. Augustin, Germany, Feb. 2003.

* cited by examiner

| N | NEQN | SQUARE | RANDOM | SHEARED | ANNULUS |
|---|------|--------|--------|---------|---------|
| 5 | 192 | 3(0.05) | 3(0.03) | 3(0.06) | 4(0.02) |
| 9 | 1536 | 4(0.34) | 5(0.42) | 4(0.31) | 4(0.36) |
| 17 | 12288 | 5(2.44) | 5(2.58) | 5(2.58) | 5(2.56) |
| 33 | 98304 | 6(19.28) | 6(19.61) | 6(19.91) | 6(19.53) |

FINITE VOLUME METHOD SYSTEM AND PROGRAM STORAGE DEVICE FOR LINEAR ELASTICITY INVOLVING COUPLED STRESS AND FLOW IN A RESERVOIR SIMULATOR

CROSS REFERENCE TO RELATED APPLICATIONS

This is a Utility Application of Provisional Application Ser. No. 60/635,866, filed Dec. 14, 2004, and entitled 'Finite Volume Methods for Linear Elasticity'.

BACKGROUND

The subject matter of this specification relates to a new finite volume method (and associated system and program storage device) for a set of Linear Elasticity equations described below; and, in particular, to a finite volume approach to discretization of a set of equations of Linear Elasticity on a general unstructured grid in three dimensions.

The flow equations in commercial reservoir simulators are generally discretized using the finite difference or finite volume method, whereas for stress equations it is more common to use the finite element approach. In a reservoir simulator designed to include geomechanical effects, these two distinct types of equations must be solved with some degree of coupling. It is therefore natural to ask: whether suitable finite volume methods can be derived for the stress equations so that the stress and fluid flow models can share a common derivation, and what the relative merits of finite volume and finite element methods are for these coupled systems.

In this specification, a finite volume discretization of a set of stress equations, as implemented in a commercial reservoir simulator, is presented with an option to couple the stress with the fluid flow. The method, as presented, is locally conservative and retains second order accuracy on general three-dimensional grids. The imposition of various types of boundary conditions is discussed and the implementation of special features is described, such as faults, pinch-outs and local grid refinements. A comparison with other approaches is presented based on finite differences (see References 1 and 2 below) and finite elements (see Reference 3 below). The relative accuracy, efficiency and robustness of these three different approaches are also discussed.

SUMMARY

One aspect of the 'Finite Volume Method for Linear Elasticity' as described in this specification involves a method for conducting a stress calculation adapted for modeling a set of stresses and displacements in a reservoir, comprising: (a) building a reservoir model over a region of interest by gridding the region of interest, the grid being comprised of one or more cells and having nodes, each cell having a cell center; (b) interpolating unknown rock displacements in the region of interest from cell centers to grid nodes; (c) integrating over each cell to form a discrete system of equations; and (d) using the discrete system of equations to model the displacements and stresses in the reservoir.

Another aspect of the 'Finite Volume Method for Linear Elasticity' as described in this specification involves a program storage device readable by a machine tangibly embodying a set of instructions executable by the machine to perform method steps for conducting a stress calculation adapted for modeling a set of stresses and displacements in a reservoir, the method steps comprising: (a) building a reservoir model over a region of interest by gridding the region of interest, the grid being comprised of one or more cells and having nodes, each cell having a cell center; (b) interpolating unknown rock displacements in the region of interest from cell centers to grid nodes; (c) integrating over each cell to form a discrete system of equations; and (d) using the discrete system of equations to model the displacements and stresses in the reservoir.

Another aspect of the 'Finite Volume Method for Linear Elasticity' as described in this specification involves a system adapted for conducting a stress calculation to model a set of stresses and displacements in a reservoir, comprising: first apparatus adapted for building a reservoir model over a region of interest by gridding the region of interest, the grid being comprised of one or more cells and having nodes, each cell having a cell center; second apparatus adapted for interpolating unknown rock displacements in the region of interest from cell centers to grid nodes; third apparatus adapted for integrating over each cell to form a discrete system of equations; and fourth apparatus adapted for modeling the reservoir while using the discrete system of equations to model the displacements and stresses in the reservoir.

Another aspect of the 'Finite Volume Method for Linear Elasticity' as described in this specification involves a computer program adapted to be executed by a processor, the computer program, when executed by the processor, practicing a process adapted for conducting a stress calculation to model a set of stresses and displacements in a reservoir, the process comprising: (a) building a reservoir model over a region of interest by gridding the region of interest, the grid being comprised of one or more cells and having nodes, each cell having a cell center; (b) interpolating unknown rock displacements in the region of interest from cell centers to grid nodes; (c) integrating over each cell to form a discrete system of equations; and (d) using the discrete system of equations to model the stresses and displacements in the reservoir.

Further scope of applicability will become apparent from the detailed description presented hereinafter. It should be understood, however, that the detailed description and the specific examples set forth below are given by way of illustration only, since various changes and modifications within the spirit and scope of the 'Finite Volume Method for Linear Elasticity', as described and claimed in this specification, will become obvious to one skilled in the art from a reading of the following detailed description.

BRIEF DESCRIPTION OF THE DRAWINGS

A full understanding will be obtained from the detailed description presented herein below, and the accompanying drawings which are given by way of illustration only and are not intended to be limitative to any extent, and wherein.

DESCRIPTION

Figures 1, 2:
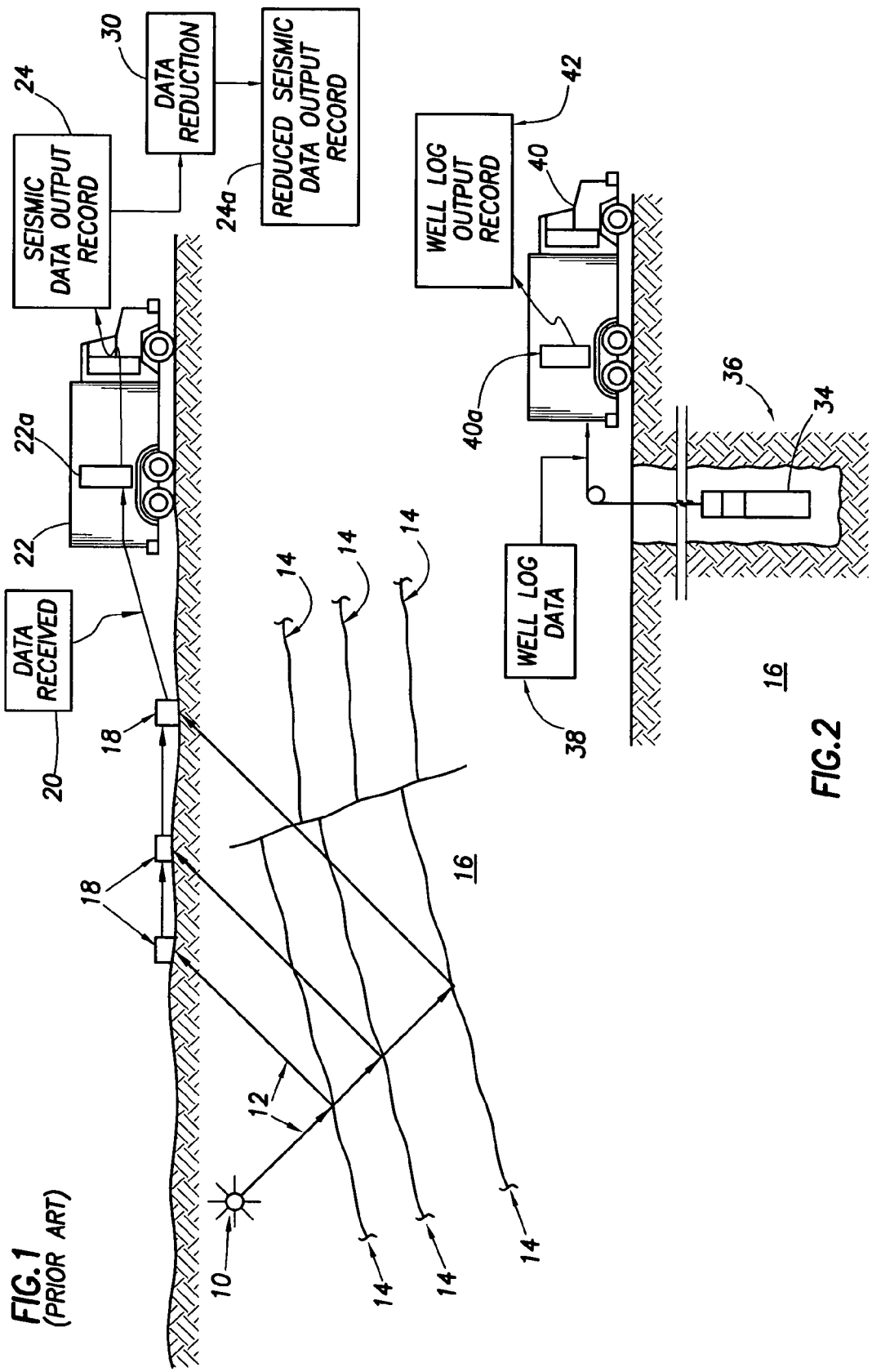
FIG. 1 illustrates a seismic operation for producing a reduced seismic data output record, the seismic operation of FIG. 1 including a data reduction operation.
FIG. 2 illustrates a wellbore operation for producing a well log output record.

Oil and gas is produced from underground rock formations. These rocks are porous, just like a sponge, and they are filled with fluid, usually water. This porous characteristic of rocks is known as porosity. These rocks in addition to being porous have the ability to allow fluids to flow through the pores, a characteristic measured by a property called permeability. When oil (or gas) is trapped in such formations, it may be possible to extract it by drilling wells that tap into the formation. As long as the pressure in the well is lower than that in the rock formation, the fluids contained in the pores will flow into the well. These fluids may then flow naturally up the well to the surface, or the flow up the well may have to be assisted by pumps. The relative amounts of oil, gas and water that are produced at the surface will depend on the fraction of the rock pore space that is occupied by each type of fluid. Water is always present in the pores, but it will not flow unless its volume fraction exceeds a threshold value that varies from one type of rock to another. Similarly, oil and gas will only flow as long as their volume fractions exceed their own thresholds.

The characteristics of the rock (including porosity and permeability) in an oil reservoir vary greatly from one location to another. As a result, the relative amounts of oil, gas and water that can be produced will also vary from reservoir to reservoir. These variations make it difficult to predict simply the amount of fluids and gases a reservoir will produce and the amount of resources it will require to produce from a particular reservoir. However, the parties interested in producing from a reservoir need to project the production of the reservoir with some accuracy in order to determine the feasibility of producing from that reservoir. Therefore, in order to forecast production rates accurately from all of the wells in a reservoir, it is necessary to build a detailed mathematical model of the reservoir's geology and geometry.

A large amount of research has been focused on the development of reservoir simulation tools. These tools include mathematical and computer models that describe and which are used to predict, the multiphase flow of oil and gas within a three dimensional underground formation (a "field"). Reservoir tools use empirically acquired data to describe a field. These data are combined with and manipulated by mathematical models whose output describes specified characteristics of the field at a future time and in terms of measurable quantities such as the production or injection rates of individual wells and groups of wells, the bottom hole or tubing head pressure at each well, and the distribution of pressure and fluid phases within the reservoir.

The mathematical model of a reservoir is typically done by dividing the reservoir volume into a large number of interconnected cells and estimating the average permeability, porosity and other rock properties for each cell. This process makes use of seismic data, well logs, and rock cores recovered when wells are drilled. Production from the reservoir can then be mathematically modeled by numerically solving a system of three or more nonlinear, partial differential equations describing fluid flow in the reservoir.

Computer analysis of production from an oil reservoir is usually divided into two phases, history matching and prediction. In the history matching phase, the past production behavior of the reservoir and its wells is repeatedly modeled, beginning with initial production and continuing up to the present time. The first computer run is based on a geological model as described above. After each run, the computer results are compared in detail with data gathered in the oil field during the entire period of production. Geoscientists modify the geological model of the reservoir on the basis of the differences between computed and actual production performance and rerun the computer model. This process continues until the mathematical reservoir model behaves like the real oil reservoir.

Once a suitable history match has been obtained, production from the oil reservoir can be predicted far into the future (sometimes for as long as 50 years). Oil recovery can be maximized and production costs minimized by comparing many alternative operating plans, each requiring a new run of the computer model. After a field development plan is put into action, the reservoir model may be periodically rerun and further tuned to improve its ability to match newly gathered production data.

When sufficient data is obtained about the reservoir, characteristics of a reservoir can be mathematically modeled to predict production rates from wells in that reservoir. The gross characteristics of the field include the porosity and permeability of the reservoir rocks, the thickness of the geological zones, the location and characteristics of geological faults, relative permeability and capillary pressure functions and such characteristics of the reservoir fluids as density, viscosity and phase equilibrium relationships. From this data, a set of continuous partial differential equations (PDEs) are generated that describe the behavior of the field as a function of time and production parameters. These production parameters include the locations of wells, the characteristics of the well's completions, and the operating constraints applied to the wells. Operating constraints may include such as the production rate of a particular fluid phase, the bottom hole pressure, the tubing head pressure, or the combined flow rates of a group of wells. These constraints may be applied directly by data or by means of another simulator that models the flow of fluids in the surface equipment used to transport the fluids produced from or injected into the wells. However, because only the simplest system of PDEs can be solved using classic or closed-form techniques (e.g., a homogeneous field having circular boundaries), a model's PDEs are converted into a set of non-linear approximations which are then solved numerically. One approximation technique is the finite difference method. In the finite difference method, reservoir PDEs are converted into a series of difference quotients which divide a reservoir into a collection of discrete three dimensional cells, which are then solved for at discrete times to determine (or predict) the value of reservoir characteristics such as pressure, permeability, fluid fractions, and at a later time.

As oil and/or gas are extracted from the reservoir, by means of the wells, the pressure in the reservoir reduces, and there is a tendency for the porous rock in the formation to compact. For strong rocks, this effect may not have a significant effect on the simulation and need not be taken into consideration when solving the reservoir flow equations. For weaker rocks, the effect is more significant and we ideally want to model the movement of the reservoir rock by solving the linear elasticity equations describing their displacements and the stresses present in the rock. These equations are coupled to the reservoir flow equations by a pressure term in the stress tensor. There is also an implicit coupling by virtue of the fact that the grid cells used to solve the flow equations should ideally be moved according to the displacements obtained from solving the elasticity equations. In practice, for small relative displacements, this effect can be reasonably approximated by a modification to the porosity.

Within the computerized 'reservoir simulator', reservoir performance is modeled in discrete increments of time. Each so-called timestep advances the solution from a previous point in time, where all variables are known, to a future point in time, where all variables are unknown. This process is repeated until the entire time period of interest has been modeled. Within each timestep, it is necessary to solve a huge system of nonlinear equations that models fluid flow from cell to cell and through the wells. (With current technology it is possible to include several million cells in the reservoir model.) Solutions to the system of nonlinear equations are obtained by Newton iteration. In each such iteration the system of nonlinear equations is approximated by a system of linear equations, which must be solved by yet another iterative procedure. One such 'reservoir simulator' is the "Eclipse" reservoir simulator that is owned and operated by Schlumberger Technology Corporation of Houston, Tex.

Figure 10:
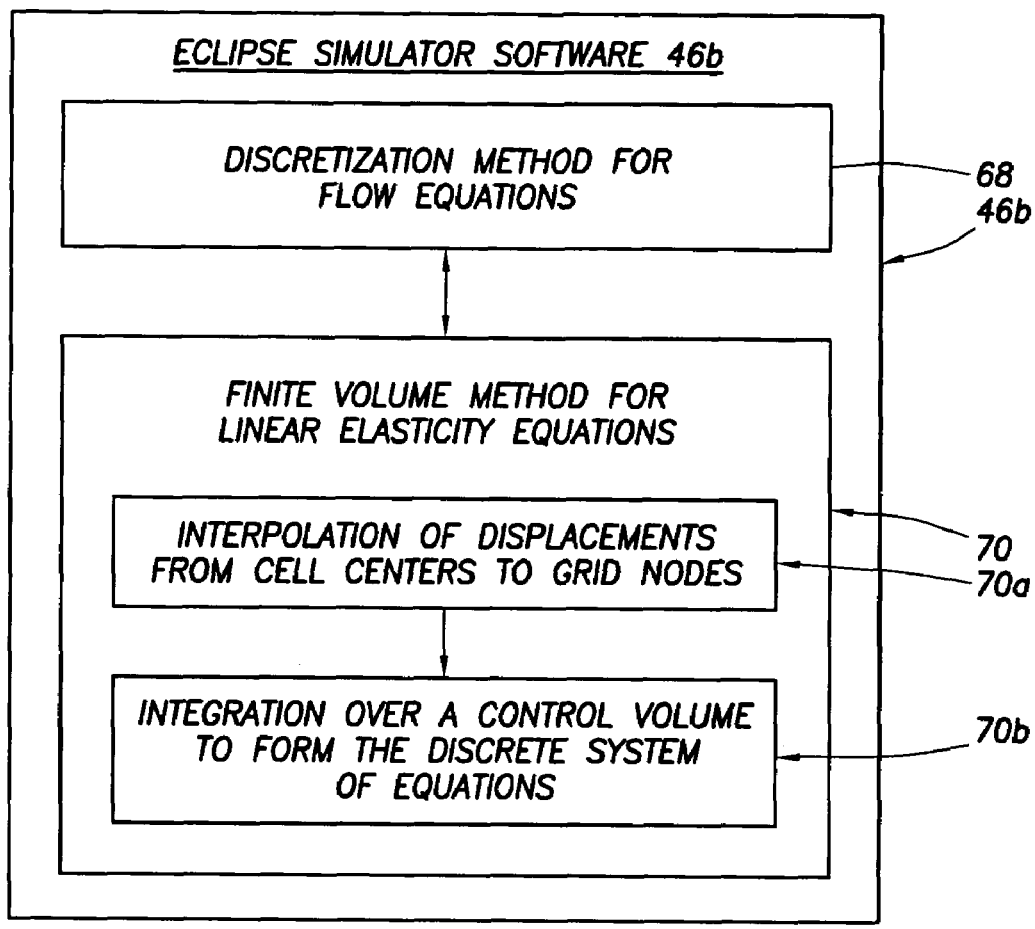
FIG. 10 illustrates the Eclipse simulator software of FIGS. 5 and 6 which includes the 'Finite Volume Method for Linear Elasticity Equations' as described in this specification.

The "Eclipse" simulator software receives output data from the "Flogrid" simulation gridding software and, responsive thereto, the "Eclipse" simulator software generates a set of simulation results which are displayed on a 3D viewer. The "Flogrid" simulation gridding software is described in U.S. Pat. No. 6,106,561 to Farmer, the disclosure of which is incorporated by reference into this specification. As illustrated in FIG. 10, the "Eclipse" simulator software includes a "Finite Volume Method" software "for Linear Elasticity Equations" (including its associated system and program storage device). The "Finite Volume Method for Linear Elasticity Equations" of FIG. 10 (and associated system and program storage device) describes in detail one possible implementation of a finite volume method for linear elasticity, indicating its suitability on general unstructured and cornerpoint meshes, and demonstrating its order of accuracy.

This specification includes: (1) a Background discussion with reference to FIGS. 1-9 which provides background information relating to the performance of a seismic operation and a well logging operation adapted for generating seismic and well logging data, the seismic and well logging data being provided as input data to a workstation that stores a "Flogrid" simulation gridding software and an "Eclipse" simulator software, and (2) a description of the "Eclipse" simulator software further including the "Finite Volume Method" software "for Linear Elasticity Equations" (and associated system and program storage device) discussed below with reference to FIGS. 10-23 representing one possible implementation of a 'finite volume method for linear elasticity'.

Referring to FIG. 1, a method and apparatus for performing a seismic operation is illustrated. During a seismic operation, a source of acoustic energy or sound vibrations 10, such as an explosive energy source 10, produces a plurality of sound vibrations. In FIG. 1, one such sound vibration 12 reflects off a plurality of horizons 14 in an earth formation 16. The sound vibration(s) 12 is (are) received in a plurality of geophonereceivers 18 situated on the earth's surface, and the geophones 18 produce electrical output signals, referred to as "data received" 20 in FIG. 1, in response to the received sound vibration(s) 12 representative of different parameters (such as amplitude and/or frequency) of the sound vibration(s) 12. The "data received" 20 is provided as "input data" to a computer 22a of a recording truck 22, and, responsive to the "input data", the recording truck computer 22a generates a "seismic data output record" 24. Later in the processing of the seismic data output record 24, such seismic data undergoes "data reduction" 30 in a mainframe computer, and a "reduced seismic data output record" 24a is generated from that data reduction operation 30.

Referring to FIG. 2, a well logging operation is illustrated. During the well logging operation, a well logging tool 34 is lowered into the earth formation 16 of FIG. 1 which is penetrated by a borehole 36. In response to the well logging operation, well log data 38 is generated from the well logging tool 34, the well log data 38 being provided as "input data" to a computer 40a of a well logging truck 40. Responsive to the well log data 38, the well logging truck computer 40a produces a "well log output record" 42.

Figure 3:
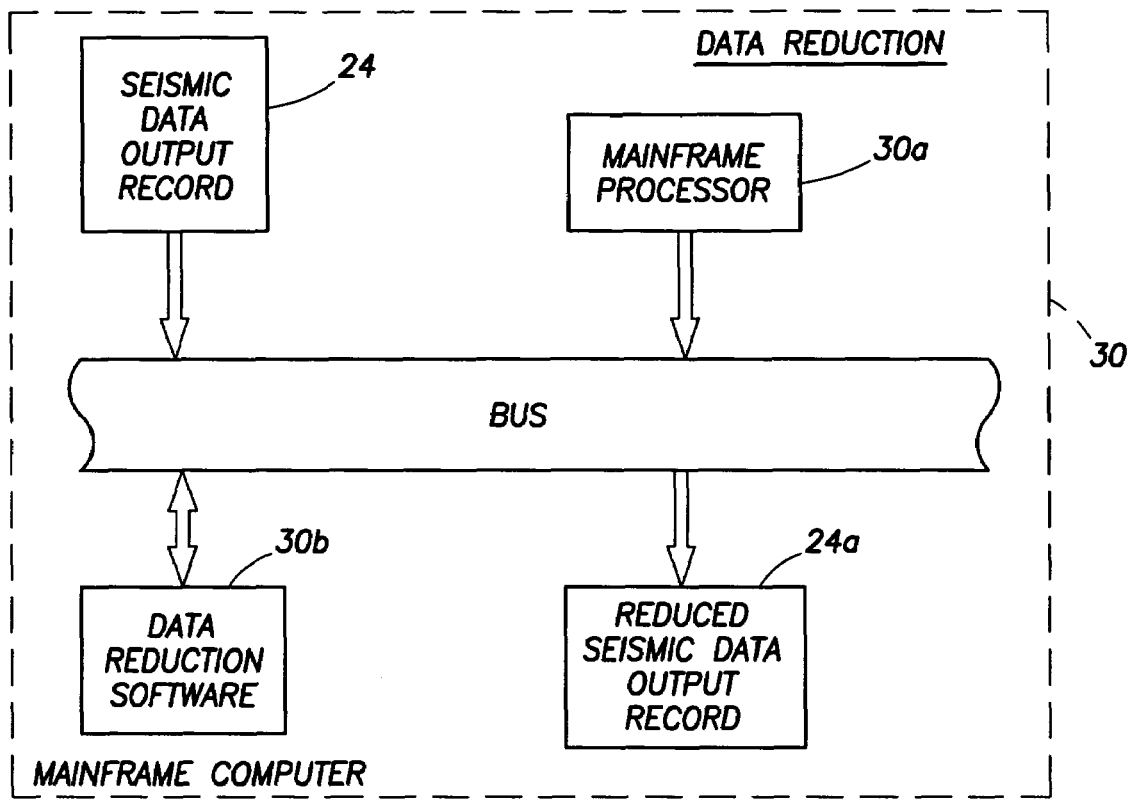
FIG. 3 illustrates a computer system for performing the data reduction operation of FIG. 1.

Referring to FIG. 3, the seismic data output record 24 of FIG. 1 is provided as "input data" to a mainframe computer 30 where the data reduction operation 30 of FIG. 1 is performed. A mainframe processor 30a will execute a data reduction software 30b stored in a mainframe storage 30b. When the execution of the data reduction software 30b is complete, the reduced seismic data output record 24a of FIGS. 1 and 3 is generated.

Figure 4:
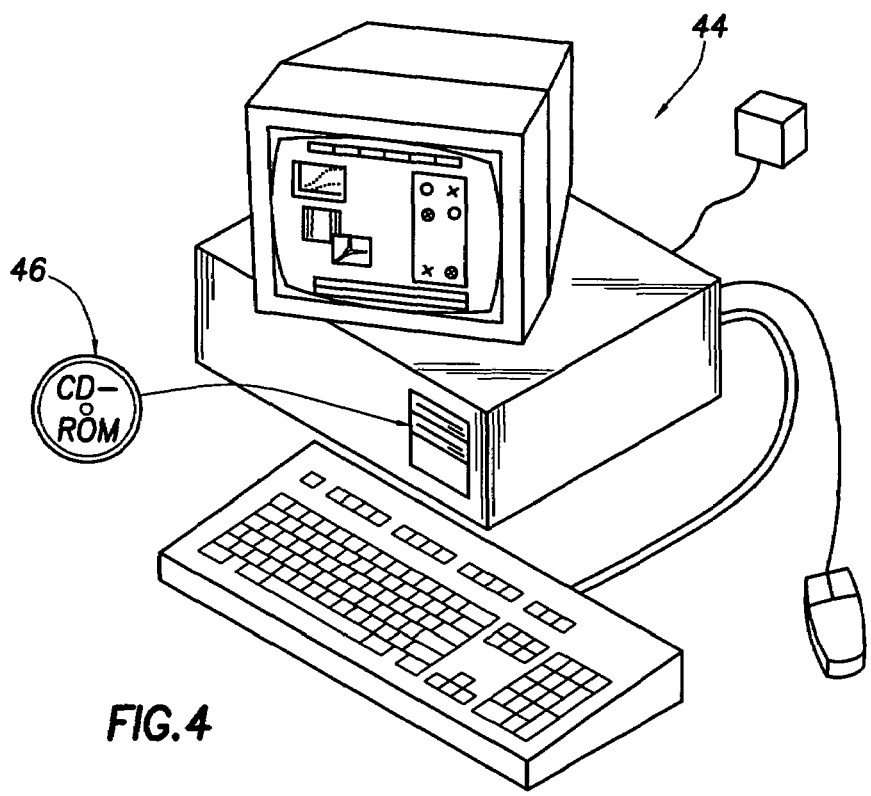
FIGS. 4 and 5 illustrate a workstation adapted for storing a "Flogrid" software and an "Eclipse" simulator software.
Figure 5:
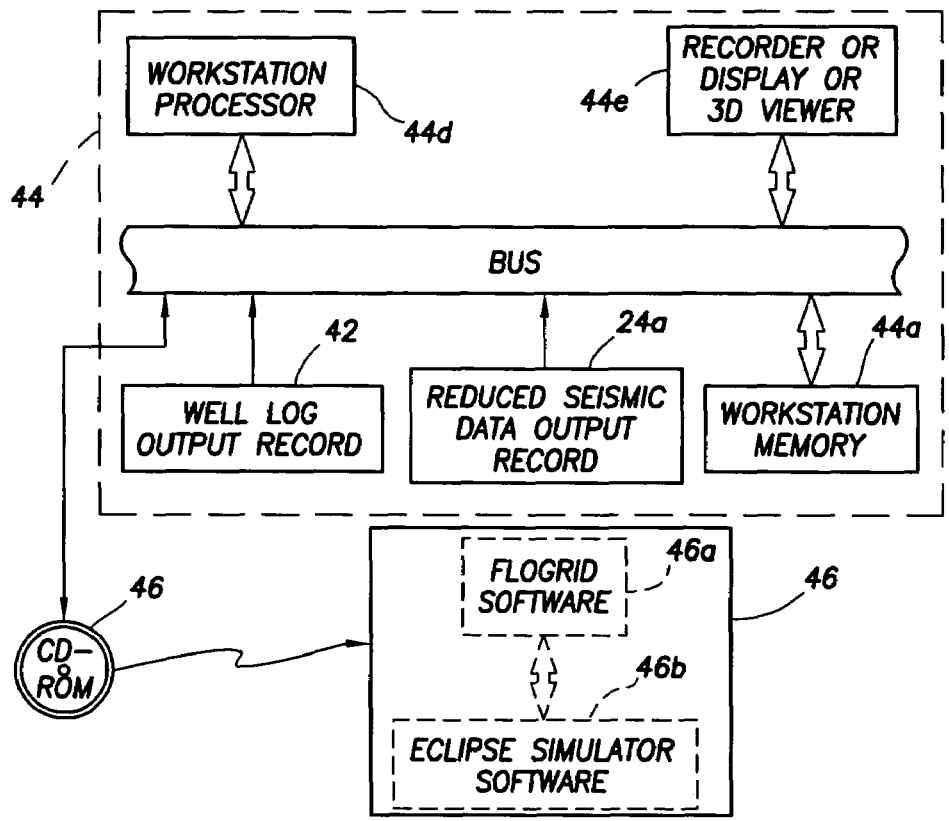

Referring to FIGS. 4 and 5, a workstation 44 is illustrated in FIG. 4. A storage medium 46, such as a CD-Rom 46, stores software, and that software can be loaded into the workstation 44 for storage in the memory of the workstation. In FIG. 5, the workstation 44 includes a workstation memory 44a, the software stored on the storage medium (CD-Rom) 46 being loaded into the workstation 44 and stored in the workstation memory 44a. A workstation processor 44d will execute the software stored in the workstation memory 44a in response to certain input data provided to the workstation processor 44d, and then the processor 44d will display or record the results of that processing on the workstation "recorder or display or 3D viewer" 44e. The input data, that is provided to the workstation 44 in FIG. 5, includes the well log output record 42 and the reduced seismic data output record 24a. The "well log output record" 42 represents the well log data generated during the well logging operation in an earth formation of FIG. 2, and the "reduced seismic data output record" 24a represents data-reduced seismic data generated by the mainframe computer 30 in FIG. 3 in response to the seismic operation illustrated in FIG. 1. In FIG. 5, the software stored on the storage medium (CD-Rom) 46 in FIG. 5 includes a "Flogrid" software 46a and an "Eclipse" simulator software 46b. When the storage medium (CD-Rom) 46 is inserted into the workstation 44 of FIG. 5, the "Flogrid" software 46a and the "Eclipse" simulator software 46b, stored on the CD-Rom 46, are both loaded into the workstation 44 and stored in the workstation memory 44a. The "Flogrid" software 46a and the "Eclipse" simulator software 46b are owned and operated by Schlumberger Technology Corporation of Houston, Tex. The "Flogrid" software 46a is disclosed in U.S. Pat. No. 6,106,561 to Farmer entitled 'Simulation Gridding Method and Apparatus including a Structured A real Gridder Adapted for use by a Reservoir Simulator', the disclosure of which is incorporated by reference into this specification. When the workstation processor 44d executes the Flogrid software 46a and the Eclipse simulator software 46b, the "Eclipse" simulator software 46b responds to a set of more accurate grid cell property information associated with a respective set of grid blocks of a structured simulation grid generated by the "Flogrid" software 46a by further generating a set of more accurate simulation results which are associated, respectively, with the set of grid blocks of the simulation grid. Those simulation results are displayed on the 3D viewer 44e of FIG. 5 and can be recorded on a recorder 44e.

Figure 6:
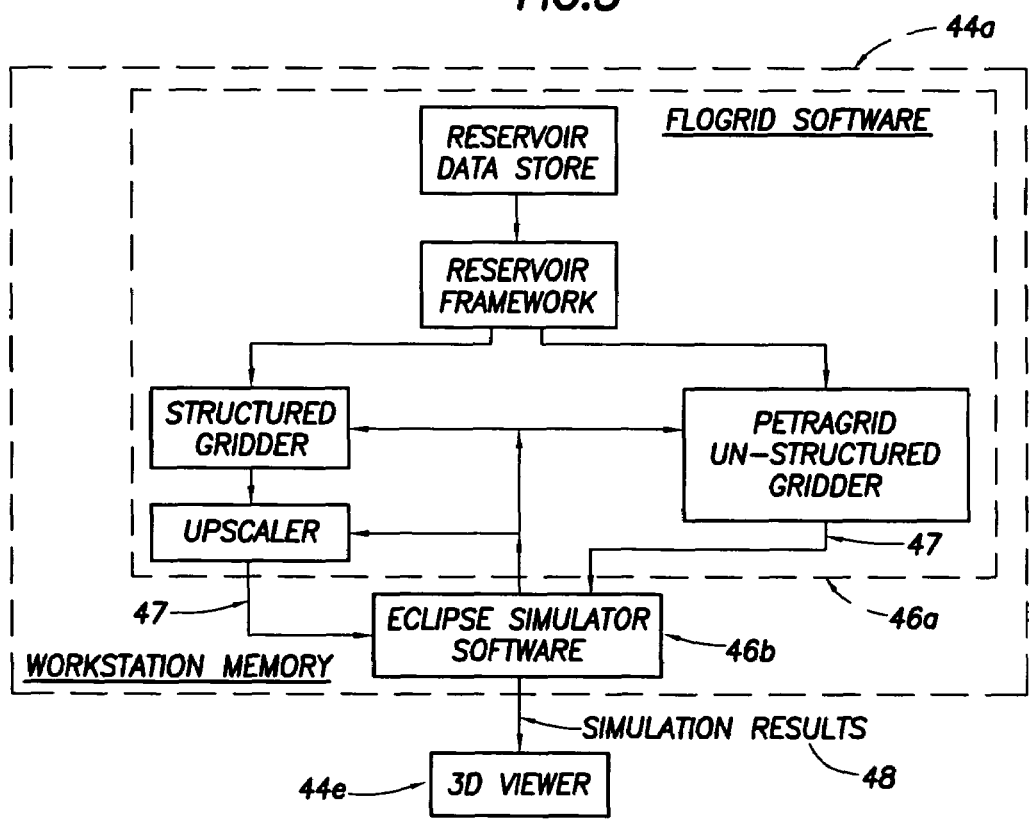
FIGS. 6 and 7 illustrate a more detailed construction of the "Flogrid" software of FIG. 5 which is adapted for generating output data for use by the "Eclipse" simulator software, the Eclipse simulator software including a "Finite Volume Method for Linear Elasticity Equations" which is described in this specification.
Figure 7:
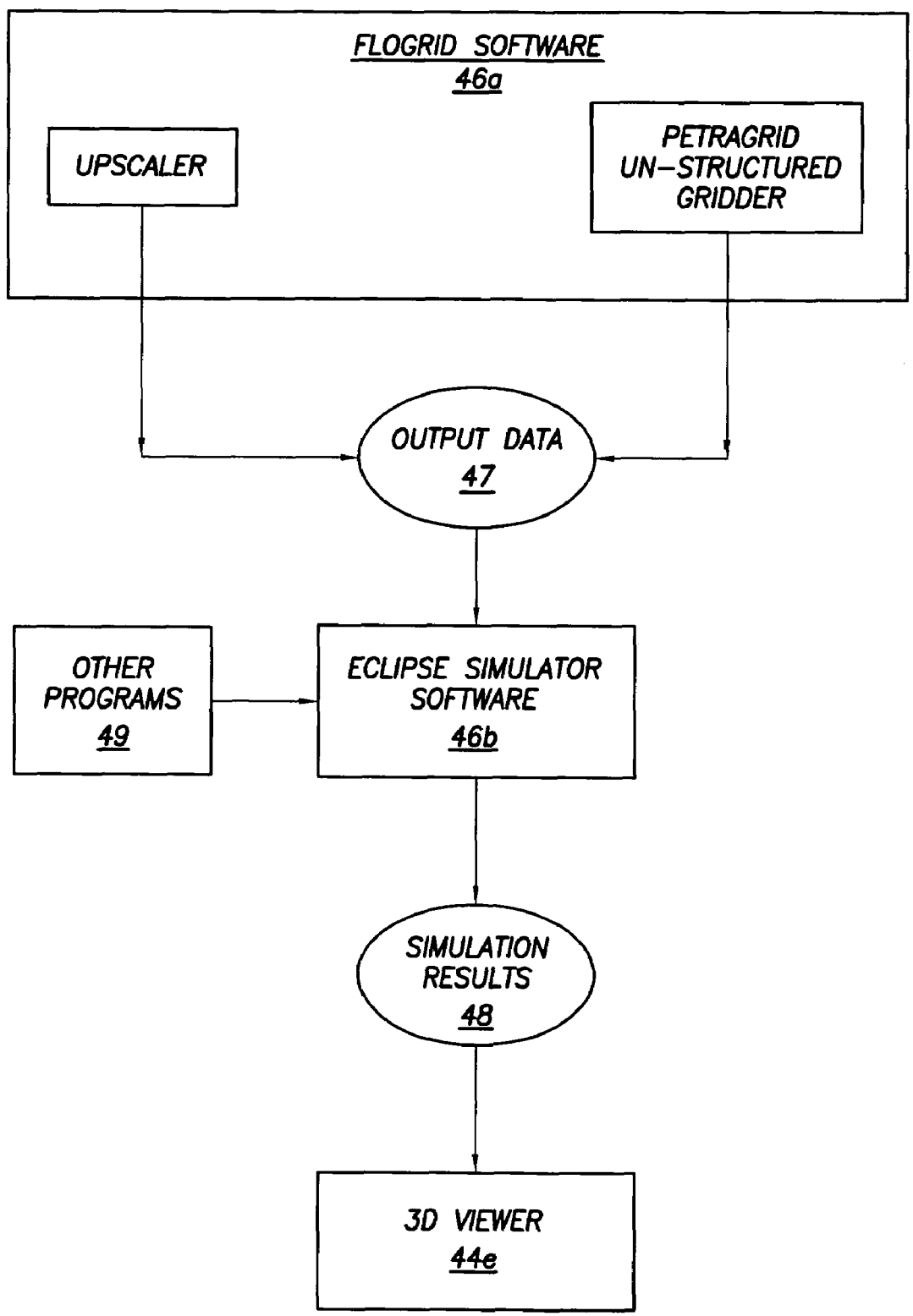

Referring to FIGS. 6 and 7, referring initially to FIG. 6, the Flogrid software 46a and the Eclipse simulator software 46b are illustrated as being stored in the workstation memory 44a of FIG. 5. In addition, the "simulation results" 48, which are output from the Eclipse simulator software 46b, are illustrated as being received by and displayed on the 3D viewer 44e. The Flogrid software 46a includes a reservoir data store, a reservoir framework, a structured gridder, an unstructured gridder, and an upscaler, all of which are fully discussed in the above referenced U.S. Pat. No. 6,106,561 to Farmer, the disclosure of which has already been incorporated by reference into this specification. In FIG. 6, a set of "simulation grids and properties associated with the grids" 47, generated by the Upscaler and the "Petragrid" unstructured gridder, are received by the Eclipse simulator software 46b. In response, the Eclipse simulator software 46b generates a "set of simulation results associated, respectively, with a set of grid blocks of the simulation grids" 48, and the simulation results and the associated grid blocks 48 are displayed on the 3D viewer 44e. The "Petragrid" unstructured gridder is disclosed in U.S. Pat. Nos. 6,018,497 and 6,078,869, the disclosures of which are incorporated by reference into this specification.

In FIG. 7, the Flogrid software 46a generates a set of output data 47 comprising a plurality of grid cells and certain properties associated with those grid cells. That output data 47 is provided as input data to the Eclipse simulator software 46b. Some other programs 49 provide other input data to the Eclipse simulator software 46b. In response to the output data 47 (comprised of a gridded earth formation including a plurality of grid cells and certain properties associated with each of the grid cells), as well as the other output data from the other programs 49, the Eclipse simulator software 46b generates a set of "simulation results" 48, the simulation results 48 including the plurality of grid cells and a plurality of simulation results associated, respectively, with the plurality of grid cells. The aforementioned plurality of grid cells and the plurality of simulation results associated, respectively, with the plurality of grid cells are displayed on the 3D Viewer 44e of FIGS. 6 and 7.

Figure 8:
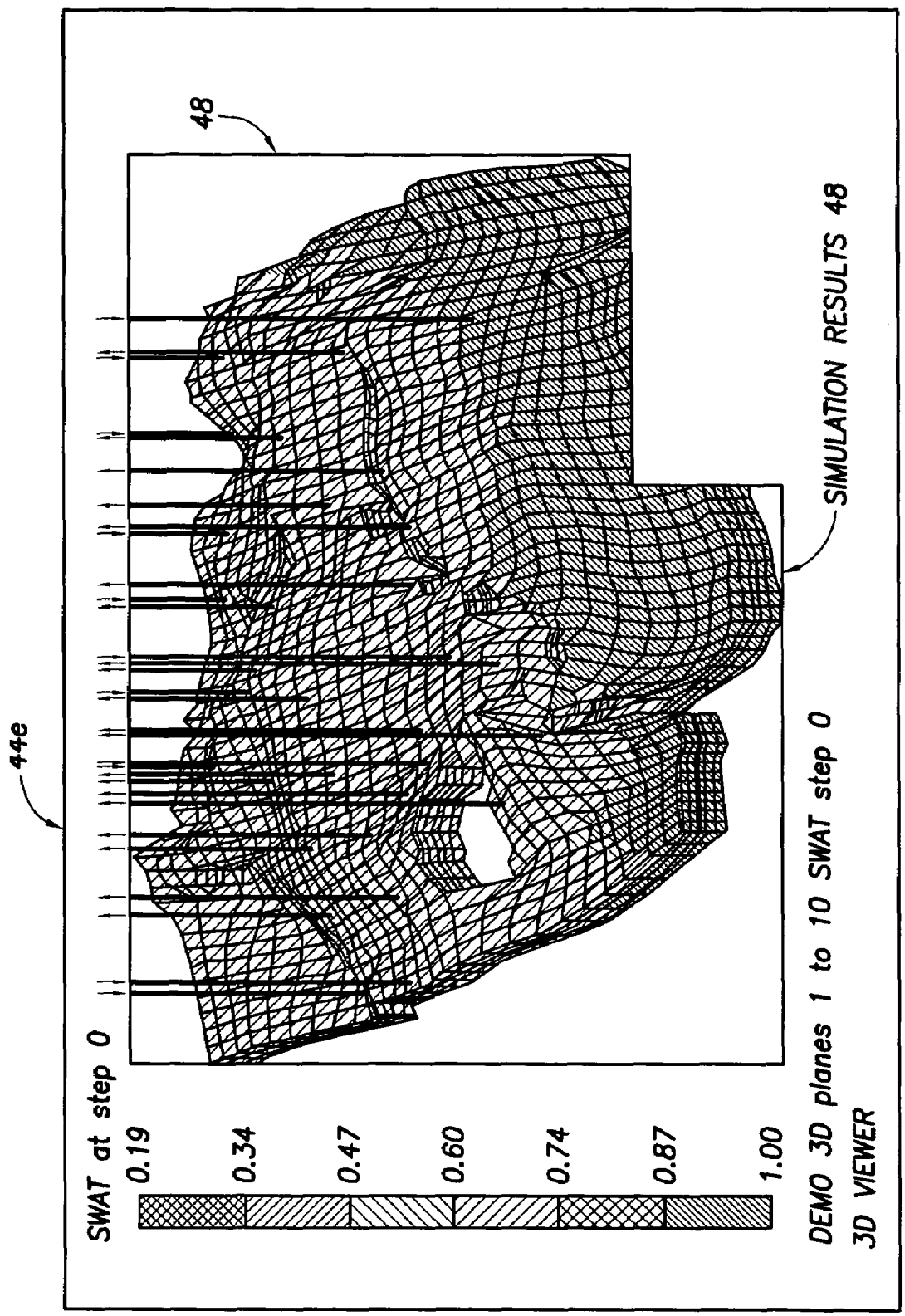
FIG. 8 illustrates an example of a typical output display generated by the "Eclipse" simulator software of FIG. 6 which is displayed on the 3D viewer of FIG. 6.

Referring to FIG. 8, an example of the simulation results 48 (i.e., the "plurality of grid cells and the plurality of simulation results associated, respectively, with the plurality of grid cells" 48) which are displayed on the 3D viewer 44e of FIGS. 5 and 6 and 7, is illustrated in FIG. 8.

Figure 11:
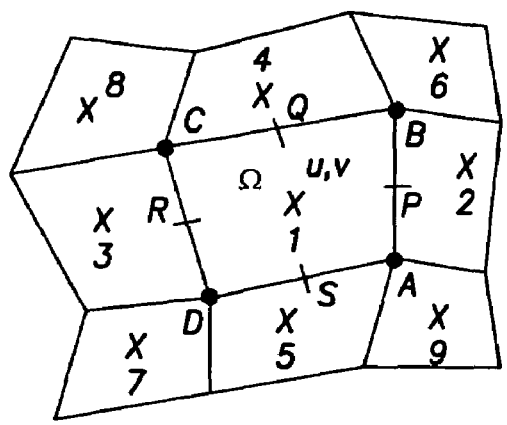
FIG. 11 illustrates a section of a two dimensional Finite Volume Grid.

The following paragraphs will present the Eclipse Simulator Software 46b of FIGS. 5, 6, and 7, where the Eclipse Simulator Software 46b further includes a Detailed Description of a "Finite Volume Method" (and associated System and Program Storage Device) "for Linear Elasticity Equations", as shown in FIG. 10. In particular, the following paragraphs will present a Detailed Description of a Finite Volume Approach to Discretization of the Equations of Linear Elasticity on a General Unstructured Grid in Three Dimensions, as shown in FIG. 11.

Figure 9:
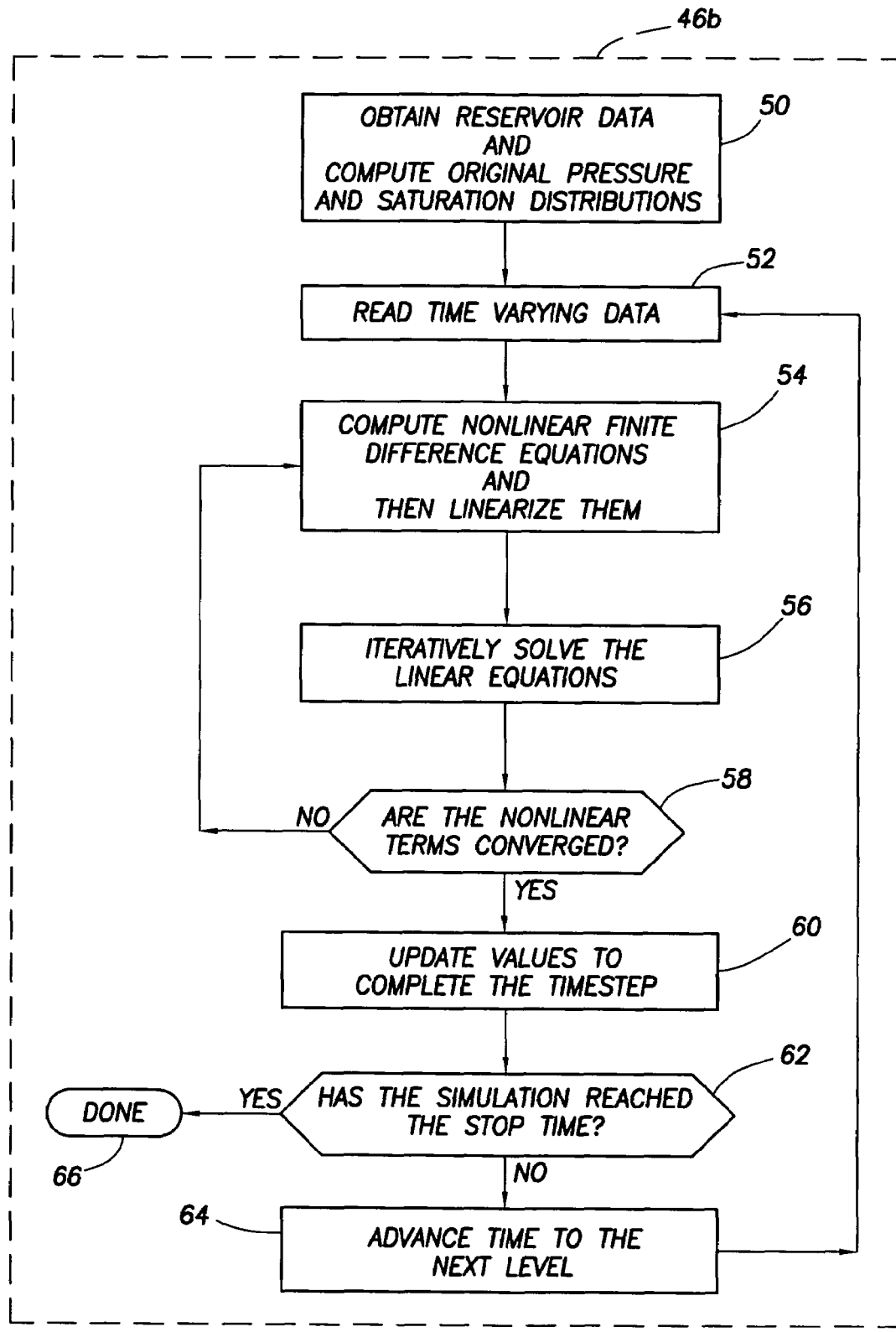
FIG. 9 illustrates a prior art approach or method of performing reservoir simulation which has been practiced by prior art reservoir simulators.

Referring to FIG. 9, a general outline of the operation of a prior art reservoir simulator is discussed below with reference to FIG. 9. In FIG. 9, reservoir data 42 and 24a of FIG. 5 and rock core data are used to describe a computational grid and the properties of the reservoir rocks. This data is combined with data relating to the physical properties of the fluids contained in the reservoir, the combined data being used to compute the initial distributions of pressure and fluid saturations (volume fractions) as well as the composition of each fluid phase, block 50 in FIG. 9. Time varying data, such as the locations and characteristics of wells, production and injection flow rate controls, and simulator control information is read from a data base, block 52. Using the current pressure, saturation, and fluid compositions for each grid cell, the partial differential equations describing mass balances are approximated by finite differences in block 54 which results in two or more nonlinear algebraic equations for each grid cell. Also, in block 54, these nonlinear equations are linearized by means of Newton's method. In block 56, the resulting system of linear equations is solved iteratively, using methods described in this specification. After the linear equations have been solved, there is a test in block 58 to determine whether all of the nonlinear terms in the finite difference equations have converged. If not, the simulator returns to block 54. If the nonlinear terms in the finite difference equations have converged, the simulator moves to block 60 and updates values to complete the current timestep. In block 62, the simulator tests to determine whether the desired ending time (i.e., the stop time) in the simulation has been reached. If not, the simulator advances time to the next level, block 64, and then it returns to block 52 to read new time varying data and to begin the next timestep. If the endpoint of the simulation has been reached, then, the simulator completes output operations and the run is finished, block 66.

Referring to FIG. 10, recall from our previous discussion that 'Flow Equations' in commercial reservoir simulators are generally discretized using the 'Finite Volume' (or finite difference) method but 'Stress Equations' are generally discretized using the 'Finite Element' approach. As a result, in FIG. 10, the Eclipse Simulator software 46b includes the following software block: a 'Discretization Method for Flow Equations' 68. In addition, recall from our previous discussion that 'it would be natural to ask whether Finite Volume methods can be derived for the Stress Equations'; and, as a result, a 'Finite Volume discretization of a set of Stress Equations' is presented in this specification. Accordingly, in FIG. 10, the Eclipse simulator software 46b of FIGS. 5 and 6 and 7 includes the following additional software block: a 'Finite Volume Method for Linear Elasticity Equations' 70 (i.e., the 'Stress Equations'). In FIG. 10, the "Finite Volume Method for Linear Elasticity Equations" step 70 receives and responds to the 'Discretization Method for Flow Equations' step 68.

Since the 'Flow Equations', in commercial reservoir simulators, are generally discretized using the finite difference or 'Finite Volume' method and, the 'Stress Equations' are generally discretized using the 'Finite Element' approach, in FIG. 10, the 'Finite Volume Method for Linear Elasticity Equations' 70 disclosed in this specification represents one possible 'Discretization method for Stress Equations' using the 'Finite Volume' method. That is, the 'Finite Volume Method for Linear Elasticity Equations' 70 of FIG. 10 represents one possible implementation of a 'Finite Volume method for Linear Elasticity' (involving 'displacements' and 'stresses'), indicating its suitability on general unstructured and corner-point meshes, and demonstrating its order of accuracy.

In FIG. 10, the "Finite Volume Method for Linear Elasticity Equations" 70, representing one possible 'Discretization method for Stress Equations' using the 'Finite Volume' method, includes the following two steps: (1) Interpolation of displacements from cell centers to grid nodes, step 70a, and (2) Integration over a control volume to form the discrete system of equations, step 70b.

Each of the above referenced two steps 70a and 70b illustrated in FIG. 10 associated with the "Finite Volume Method for Linear Elasticity Equations" 70 of FIG. 10 disclosed in this specification will be discussed in detail below with reference to FIGS. 11 through 23 of the drawings.

This specification describes a 'Finite Volume approach to discretization of the equations of Linear Elasticity on a general unstructured grid in three dimensions'. This arose from the need to model stress fields in combination with multiphase porous media flow in a commercial reservoir simulator. In this context, it is naturally desirable to solve the equations for stress on the same grid as that used for the fluid flow, and preferably with rock displacement variables located at the same points as the flow variables, such as pressure and saturation. The grids commonly used in reservoir simulators are either based on corner-point geometry, or are fully unstructured. In either case, they are capable of representing such features as faults, pinch-outs and local grid refinements. In practice, they are often also highly non-orthogonal. It is important therefore to design a discretization of the stress equations that can be implemented on grids of this type.

The equations of Linear Elasticity in general domains are most commonly solved by the Finite Element method, with displacements located at the vertices of each cell of the grid. However, the evolution of flow in a reservoir simulator is rarely modeled with finite elements, but generally uses a finite volume, or finite difference approach. It is natural to ask, therefore, whether the coupled equations can be satisfactorily modeled using a common approach of finite volume discretisation for both systems.

In FIG. 10, this specification provides a partial answer to this question by describing in detail one possible implementation of the 'Finite Volume Method for Linear Elasticity Equations' (step 70 of FIG. 10) indicating its suitability on general unstructured and corner-point meshes, and demonstrating its order of accuracy.

Finite volume methods have long been in use in computational fluid dynamics for discretisation of systems of conservation laws, such as the Euler and Navier-Stokes equations (see references 4, 5, and 6 below). Reservoir flow equations have also been solved using finite volume methods (see references 7 and 8 below). Applications of finite volume methods to stress equations are rare, but include Demirdzic and Muzaferija (1994) and Demirdzic and Martinovic (1993—see references 9 and 10 below). The latter addresses thermo-elasto-plastic stress analysis.

Coupled reservoir flow and stress equations have been solved within the context of a commercial reservoir simulator by Stone et al (2000), Stone et al (2003), and Liu et al (2004—see references 1, 2, and 4 below), which describes a finite element approach to the stress equations.

Linear Elasticity Equations

The equations describing the linear elasticity of rock in a hydrocarbon reservoir are $$\nabla \cdot \Sigma + b = 0 \qquad (1)$$

where b is a vector of body forces and the stress tensor $\Sigma$ is given by $$\sum = \begin{pmatrix} \sigma_{xx} & \sigma_{xy} & \sigma_{xz} \\ \sigma_{xy} & \sigma_{yy} & \sigma_{yz} \\ \sigma_{xz} & \sigma_{yz} & \sigma_{zz} \end{pmatrix} \qquad (2)$$

$$\sigma_{xx} = \lambda(u_x + v_y + w_z) + 2\mu u_x - \alpha p - \alpha_T(2\mu + 3\lambda)T$$

$$\sigma_{yy} = \lambda(u_x + v_y + w_z) + 2\mu v_y - \alpha p - \alpha_T(2\mu + 3\lambda)T$$

$$\sigma_{zz} = \lambda(u_x + v_y + w_z) + 2\mu w_z - \alpha p - \alpha_T(2\mu + 3\lambda)T$$

$$\sigma_{xy} = \mu(u_y + v_x)$$

$$\sigma_{xz} = \mu(u_z + w_x)$$

$$\sigma_{yz} = \mu(v_z + w_y)$$

Here, 'u', 'v', and 'w' are the unknown rock displacements, while 'p' and 'T' are the pressure and temperature solved during the reservoir flow simulation. The Lamé constants $\lambda$ and $\mu$ define properties of the rock and may be derived from the Young's modulus and Poisson ratio. The Biot constant $\alpha$ and the coefficient of thermal expansion $\alpha_T$ provide the coupling between the reservoir flow and the rock momentum equations. If temperature effects are not included in the reservoir simulation, then $\alpha_T$ may be taken as zero. This system of partial differential equations is elliptic, and requires three boundary conditions to be given at all points of the boundary.

Two types of boundary conditions are common: (1) Prescribed displacements—The displacements u, v and w are given at a section of the boundary; and (2) Prescribed tractions—The traction vector $\Sigma \cdot n$ is given at a section of the boundary, where n is a unit outward pointing normal vector.

However, to ensure existence of a unique solution, there are certain restrictions on the type of boundary conditions that can be applied. This is due to the fact that the prescribed traction condition defines only derivatives of displacements. Clearly, if tractions are prescribed on all boundaries, an arbitrary constant could be added to the displacements for any valid solution, and the result would remain a solution. This can be rectified by insisting that at least one point on the boundary has a displacement boundary condition. In fact, the choice of boundary conditions is slightly more constrained than this. At least three distinct points on the boundary must have displacements specified and these points must not be collinear.

Finite Volume Method

In FIG. 10, this section of the specification will describe, in detail, a new 'Finite Volume Method for Linear Elasticity equations' (step 70 of FIG. 10) described above. The method involves two distinct steps:

(1) Interpolation of displacements from cell centers to grid nodes, step 70a of FIG. 10; and (2) Integration over a control volume to form the discrete system of equations, step 70b of FIG. 10.

These steps are described separately in the following two subsections. This is followed by a discussion of the implementation of boundary conditions and coupling of the flow equations. For clarity, the majority of the description will be for the two-dimensional method, but a section is included describing some aspects specific to its implementation in three dimensions. Finally, the properties of the method are summarized.

Although this application is directed to Linear Elasticity, it is important to note that the approach described here is also applicable to many other problems, including the reservoir flow equations themselves. In this sense, it can be regarded as an alternative to higher-order schemes, such as the multipoint flux approximation.

Interpolation to Grid Nodes, Step 70a of FIG. 10

Refer now to FIG. 11.

In FIG. 11, consider a section of a two-dimensional grid as shown in FIG. 11. At the centre of each cell, such as point 1, an approximation to the two displacements 'u' and 'v' is stored. As part of the finite volume scheme, it is necessary to define a method of interpolating displacements from cell centres to grid nodes. We choose to define an interpolation that is exact for linear functions on any grid geometry. This will ensure that the entire finite volume scheme also has this property.

In FIG. 11, to interpolate to grid node A, we will use cell centre values in the cells 1, 2, 5 and 9 which contain A as a vertex. It would be possible to fit a polynomial of an order higher than linear to these four points, since a linear function in two dimensions has only three free parameters. However, to allow for more general unstructured grid geometries, it is convenient to choose a linear approximant, and find the least-squares best-fit linear to the four cell centre values.

Figure 12:
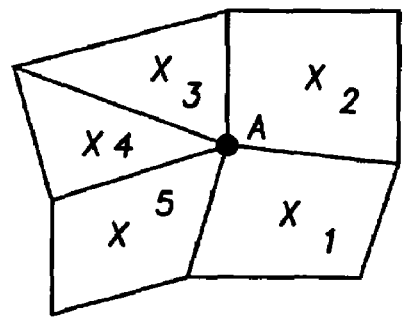
FIGS. 12 and 13 illustrate grid sections with Pinch-out and Local Grid Refinement.
Figure 13:
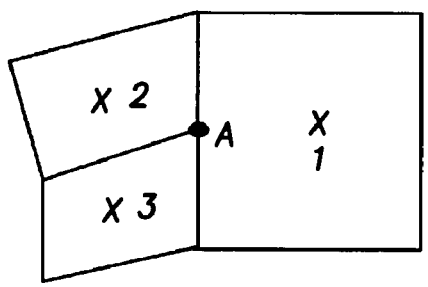

Refer now to FIGS. 12 and 13.

For example the grid sections in FIGS. 12 and 13 containing pinch-out cells and local grid refinements demonstrate that the number of neighboring cells is variable.

Define the linear function $$\phi = a + b(x - x_A) + c(y - y_A) \quad (3)$$

as the form of some function $\phi$ in the neighborhood of A. Interpolation of all n neighboring cell centre values would require solution of the system of n equations in 3 unknowns $$\begin{pmatrix} 1 & x_1 & y_1 \\ 1 & x_2 & y_2 \\ 1 & x_3 & y_3 \\ \vdots & \vdots & \vdots \\ 1 & x_n & y_n \end{pmatrix} \begin{pmatrix} a \\ b \\ c \end{pmatrix} = \begin{pmatrix} \phi_1 \\ \phi_2 \\ \phi_3 \\ \vdots \\ \phi_n \end{pmatrix}, \text{ or } Ac = \varphi \quad (4)$$

The least-squares solution of this system is obtained by solving the system of 3 equations in 3 unknowns $$A^T A c = A^T \phi \quad (5)$$

The value of a obtained from the vector c then gives the interpolated value of $\phi$ at point A. If the underlying function was indeed linear, then all n equations are satisfied by the least-squares solution. Therefore, the interpolation is exact for linear functions on any grid.

For grid nodes lying on the boundary, the interpolation may need to be modified. If displacement boundary conditions are given, these are included in the least-squares system described above. If traction boundary conditions are given, there may be less than three neighboring cell centre values, which are not sufficient to define a linear interpolant. The solution is straightforward. Additional adjacent cell centre values from the interior are added into the system until there are at least three non-collinear points. The flexibility of the least-squares approach, which can handle an arbitrary value of $n \geq 3$ makes this easy to implement.

Integration Over a Control Volume Step 70b of FIG. 10

In FIG. 11, having obtained the weights required to interpolate from cell centres to grid nodes, the finite volume method proceeds by integrating the partial differential equations over each cell of the grid. This process is described for the cell $\Omega$ in FIG. 11, with vertices ABCD and boundary $\partial\Omega$.

Integrating the equations over $\Omega$ and applying the divergence theorem gives $$\int\int_\Omega \left(\nabla \cdot \sum + b\right) dV = \oint_{\partial\Omega} \sum \cdot n dS + \int\int_\Omega b dV = 0 \quad (6)$$

which can be expressed as $$\oint_{\partial\Omega} F dy - \oint_{\partial\Omega} G dx + \int\int_\Omega b dV = 0 \quad (7)$$

$$F = \begin{pmatrix} \sigma_{xx} \\ \sigma_{xy} \end{pmatrix}, G = \begin{pmatrix} \sigma_{xy} \\ \sigma_{yy} \end{pmatrix}$$

Approximating the line integrals using the mid-point rule leads to $$F_P dy_{BA} - G_P dx_{BA} + F_Q dy_{CB} - G_Q dx_{CB} + \quad (8)$$
$$F_R dy_{DC} - G_R dx_{DC} + F_S dy_{AD} - G_S dx_{AD} + V_\Omega b_1 = 0$$

where $F_p$ denotes F evaluated at mid-side P, $dx_{BA} = x_B - x_A$ $dy_{BA} = y_B - y_A$ etc, and $V_{106}$ is the volume of $\Omega$. Note that the approximation of the line integrals by the mid-point rule will be exact if the terms in the stress tensor are linear.

Terms such as $F_p$ involve derivatives of the displacements u and v at the mid-side point P. In order to evaluate these, we set up another least-squares linear interpolant involving displacements at the two ends of the face and the two cell Secticentres adjacent to it. Note that a cell face on any unstructured grid in two dimensions always has two ends and two adjacent cells. The method can therefore accommodate all required mesh features, such as faults, pinch-outs and local grid refinements. The least-squares interpolant is set up in much the same way as for the nodal interpolants.

Figure 14:
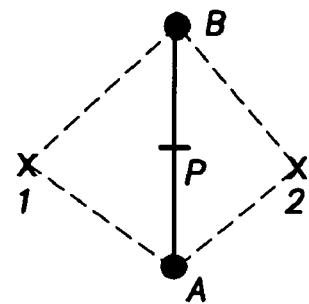
FIG. 14 illustrates integration over a control volume face.
Figure 15:
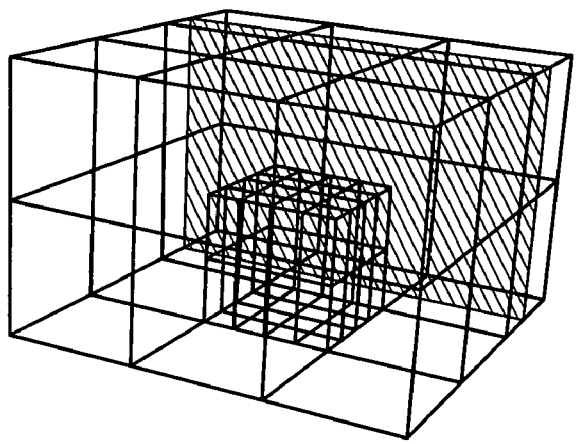
FIG. 15 illustrates a contour on slice plane through grid with local refinement.
Figure 16:
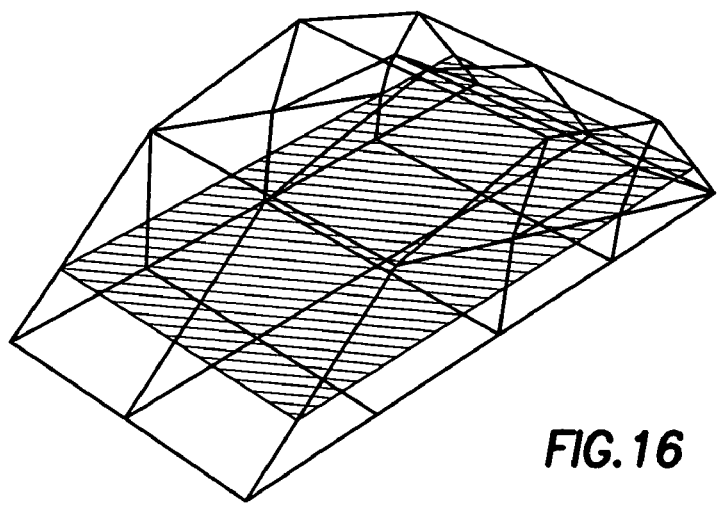
FIG. 16 illustrates transformed grid with pinch-out.
Figure 17:
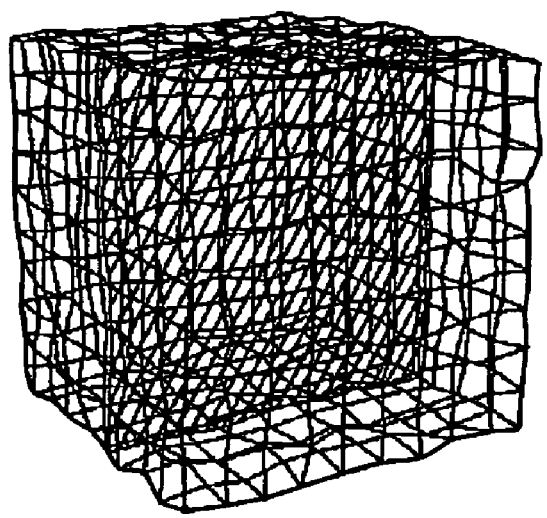
FIG. 17 illustrates a slice plane through grid with random distortion.
Figure 18:
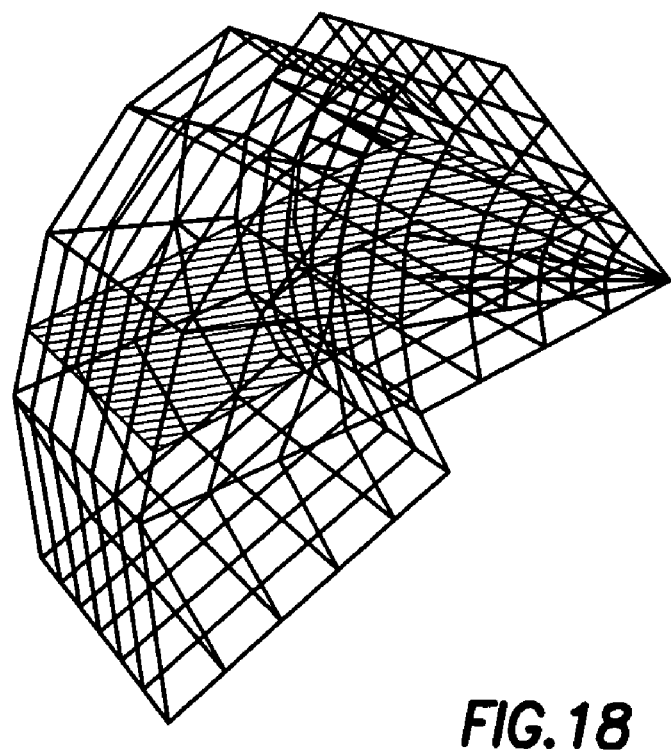
FIG. 18 illustrates a transformed grid with pinch-outs, faults and local grid refinements.

Refer now to FIG. 14.

FIG. 14 shows the side AB of the control volume ABCD from FIG. 11.

The interpolant at point P is defined in terms of displacements at points A, B, 1 and 2. The displacements at A and B are themselves defined as interpolants of neighboring cell centre values as described earlier.

Once again, we define a linear function, which is now centered at P. The system of interpolation equations is now $$\begin{pmatrix} 1 & x_1 & y_1 \\ 1 & x_2 & y_2 \\ 1 & x_A & y_A \\ 1 & x_B & y_B \end{pmatrix} \begin{pmatrix} p \\ q \\ r \end{pmatrix} = \begin{pmatrix} \psi_1 \\ \psi_2 \\ \psi_A \\ \psi_B \end{pmatrix} \quad (9)$$

Note that, unlike the interpolant previously described, there are now a fixed number of 4 equations in 3 unknowns. However, this system is solved in the same manner as before. The x-derivative of $\psi$ at P is then obtained in terms of $\psi_1$, $\psi_2$, $\psi_A$ and $\psi_B$, by taking the value of q obtained from this system. Substituting the expansions of $\psi_A$ and $\psi_B$ in terms of their neighboring cell-centre values then gives an expression for $\psi_x$ at P in terms of neighboring cell-centre values. The y-derivatives are similarly defined using the value of r. These derivative expressions are then used to construct fluxes $F_p$ and $G_p$ at P.

Boundary Conditions

If prescribed displacement boundary conditions are given at P, the boundary condition equation is added in to the least-squares system for interpolating displacements to grid nodes. If prescribed traction boundary conditions are given, there is no need to compute the derivatives of the displacements as described above. The given traction vector is simply used directly in the equation for the control volume.

An alternative approach of including displacement boundary conditions only at the control volume level, and not during interpolation to grid nodes, was also considered. This makes the cell-node interpolation more flexible, since it can be used for quantities other than displacements, but was found to give less accurate solutions, and to produce linear systems that were more difficult to solve.

Coupling to the Flow Equations

As discussed above, the stress tensor for the coupled flow-stress equations also includes terms involving pressure and temperature, as well as the Lame, Biot and thermal expansion coefficients. These quantities are all assumed to be located at cell centres, as is usual in reservoir simulation.

The treatment of these terms in the current discretisation is straightforward. Each required quantity is simply interpolated to the mid-face point P. The terms can then be directly included in the stress tensor and hence in the contribution to the control volume equation for that face.

Implementation on a Regular Grid

It is instructive to consider the implementation of this method on a regular grid of step length h. For simplicity, we continue to consider only the two-dimensional case and restrict attention to pure Linear Elasticity, with no coupled flow terms. The conclusions carry over to the more general case.

On a regular grid, the x-momentum equation has the stencil:

$$(\lambda + 2\mu) \begin{bmatrix} 0 & 0 & 0 \\ 1 & -2 & 1 \\ 0 & 0 & 0 \end{bmatrix} u + \frac{\lambda}{4} \begin{bmatrix} -1 & 0 & 1 \\ 0 & 0 & 0 \\ 1 & 0 & -1 \end{bmatrix} v + \quad (10)$$

$$\mu \begin{bmatrix} 0 & 1 & 0 \\ 0 & -2 & 0 \\ 0 & 1 & 0 \end{bmatrix} u + \frac{\mu}{4} \begin{bmatrix} -1 & 0 & 1 \\ 0 & 0 & 0 \\ 1 & 0 & -1 \end{bmatrix} v + h^2(b_1)_1 = 0$$

If we consider this stencil applied to an infinite grid in the absence of boundary conditions, it is clear that constant displacements u and v satisfy the homogeneous equation with zero body force. However, there are no other spurious trivial solutions. This property, known as discrete ellipticity, has important consequences. It means that the solution of the discrete system on a genuine mesh will not be prone to unphysical oscillations. Furthermore, the discrete ellipticity also implies that solution of the linear system by an iterative method, such as multigrid, will generally be efficient.

There are alternative finite volume discretisations that do not have this important property. An obvious one is to use the trapezoidal rule instead of the mid-point rule to compute the flux on side AB of the control volume ABCD:

$$\frac{1}{2}(F_A + F_B)dy_{BA} - \frac{1}{2}(G_A + G_B)dx_{BA} + \frac{1}{2}(F_B + F_C)dy_{CB} - \quad (11)$$

$$\frac{1}{2}(G_B + G_C)dx_{CB} + \frac{1}{2}(F_C + F_D)dy_{DC} - \frac{1}{2}(G_C + G_D)dx_{DC} +$$

$$\frac{1}{2}(F_D + F_A)dy_{AD} - \frac{1}{2}(G_D + G_A)dx_{AD} + V_\Omega b_1 = 0$$

This produces the stencil $$\frac{\lambda + 2\mu}{4} \begin{bmatrix} 1 & -2 & 1 \\ 2 & -4 & 2 \\ 1 & -2 & 1 \end{bmatrix} u + \frac{\lambda}{4} \begin{bmatrix} -1 & 0 & 1 \\ 0 & 0 & 0 \\ 1 & 0 & -1 \end{bmatrix} v + \quad (12)$$

$$\frac{\mu}{4} \begin{bmatrix} 1 & 2 & 1 \\ -2 & -4 & -2 \\ 1 & 2 & 1 \end{bmatrix} u + \frac{\mu}{4} \begin{bmatrix} -1 & 0 & 1 \\ 0 & 0 & 0 \\ 1 & 0 & -1 \end{bmatrix} v + h^2(b_1)_1 = 0$$

This stencil still admits the trivial constant solution, but also admits a spurious chequerboard oscillatory solution. For this reason, it is not discretely elliptic and will produce unphysical oscillatory solutions and be difficult to solve.

Three-Dimensional Implementation

The implementation of the finite volume method in three dimensions follows much the same lines as described above for two dimensions. The interpolation to grid nodes naturally uses a three dimensional linear function, with four undetermined coefficients instead of three. This requires at least four neighboring cell centre values and results in solution of a 4 by 4 linear least-squares system. Near boundaries, additional interior points are included as for the two-dimensional case.

The control volume integration is rather more complicated, since faces between neighboring cells in three dimensions are polygons in 3-space rather than simple lines. These polygons do not generally lie in a single plane. Integration of the flux over such polygons is handled by defining a polygon centre, and splitting the polygon into a set of triangles defined by the centre and each pair of connected polygon vertices. The flux over each triangle is then summed to define the flux over the entire face.

Properties of the Discretisation

The finite volume discretisation of the coupled flow-stress equations described above has the following properties.

(1) When applied on a regular grid, the discretisation has a compact 9-point stencil in two dimensions and a 27-point stencil in three dimensions. Near boundaries with traction boundary conditions, this stencil may be locally extended, but this is easily accomodated in a sparse matrix storage format.

(2) The unknown displacements are stored at cell centres; as are the flow variables in the coupled reservoir simulation.

(3) The interpolation to grid nodes is exact for linear functions, while the control volume integration is exact for a linear stress tensor. The overall discretisation is therefore exact for linear displacements and a linear stress tensor.

(4) The method is conservative by construction, as is generally the case for finite volume methods. This means that the flux on a face of the grid is the same when computed in both cells containing it. Consequently, if the equations are numerically integrated over the entire domain, the internal flux contributions cancel and the resulting integral depends only on the boundary fluxes. This is the discrete equivalent of the divergence theorem used to construct the finite volume discretisation.

(5) The method can handle general unstructured grids, including such mesh features as faults, pinch-outs and local grid refinements.

(6) The method is discretely elliptic.

Numerical Results

In order to validate that the current method is exact for linear solutions on any grid, and to establish its order of accuracy, it was implemented on general unstructured meshes and tested for a number of known true solutions on a sequence of refined meshes, and meshes with particular features.

Validation of Exactness of Linear Solutions

In this case, the true solution was chosen to be the set of linear functions:

$u=3x-y+2z+1$ $v=-2x-4y+z+6$ $w=x+y+z-3$  (13)

The pressure was also chosen to be linear, with a constant temperature:

$p=1000x+2000y+3000z+4000, T=4000$  (14)

The various coefficients were:

$\lambda=x+y-z+3, \mu=3x+4z+10, \alpha=1, \alpha_T=1$  (15)

Since the true stress tensor is linear for this solution, the finite volume method should be exact on any mesh. This was tested for the following cases:

(1) A sequence of regular three-dimensional meshes with increasing refinement.
(2) The same sequence with each mesh node randomly perturbed.
(3) The same sequence mapped by coordinate transformation into an annulus.
(4) Meshes with faults, pinch-outs and local grid refinements.
(5) Transformed meshes with faults, pinch-outs and local grid refinements.

Refer now to FIGS. 15, 16, 17, and 18.

In FIGS. 15-18, in all cases, the error norm between the numerical solution and the true solution was computed and was found to be effectively zero. FIGS. 15, 16, 17, and 18 illustrate the linear nature of the displacements on slice planes through the various geometries tested.

Order of Convergence for Known General Solution

In this case, a known set of displacements was chosen arbitrarily as:

$u=\sin(\pi x)\cos(\pi y/2)\sin(\pi z)$ $v=5x^2+2y^2+3z^2+1$ $w=e^{2z}\cos(x+y)$  (16)

The pressure, temperature and various coefficients were all chosen as for the linear test case. For this general solution, the stress tensor is non-linear and the body forces are therefore non-zero. The true values of these terms were calculated and included in the right-hand side of the discretisation.

Figures 19, 20:
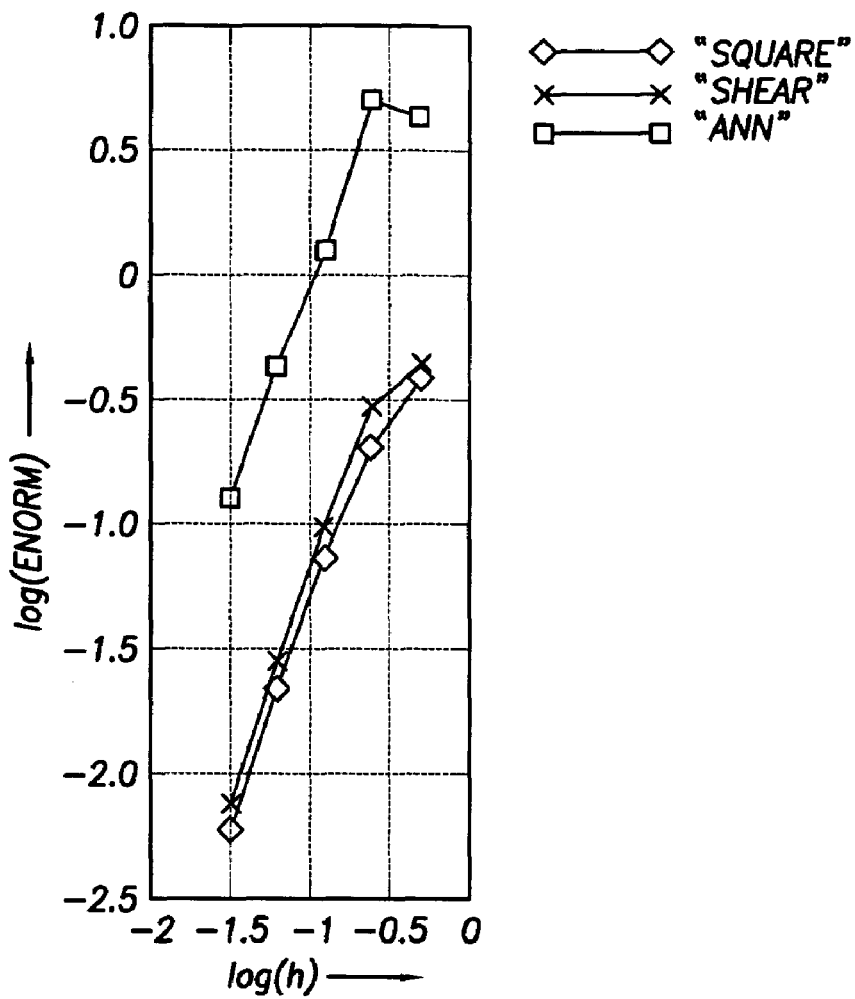
FIG. 19 illustrates the convergence rate on a sequence of grids of various types for a general known true solution.
FIG. 20 illustrates a table showing multigrid iterations (cpu time) for a sequence of meshes and transformations.

Refer now to FIG. 19.

The problem was solved on the same sequence of meshes described above. Accuracy of the numerical solution was measured by computing its error norm. FIG. 19 shows the logarithm of the error norm on a sequence of meshes, for various mesh transformations. The slope of the graph gives the order of convergence of the finite volume method, since the plot is of the log of the error norm against log of the step-length.

More negative values of log(h) correspond to finer meshes. In this region, FIG. 19 clearly indicates a slope of approximately 2 for all three geometries, namely a cube, a sheared region, and a three-dimensional annulus.

This indicates that the finite volume method is of second order accuracy on quite general meshes.

The sparse system of linear equations is solved using the algebraic multigrid method SAMG (see Reference 11). Since the system is discretely elliptic, we expect this to be an efficient solution technique and to demonstrate mesh-independent convergence rates.

Refer now to FIG. 20 which illustrates 'Table 1'.

In FIG. 20, 'Table 1' shows the number of multigrid iterations (with cpu times in parentheses) required to solve the system on a sequence of meshes with N nodes in each of the three dimensions. The number of equations in the linear system is shown as neqn.

As can be seen from Table 1 in FIG. 20, the number of multigrid iterations required is fairly independent of both the number of equations and the mesh transformation. This is the optimal convergence behavior possible, and is characteristic of multigrid applied to a discretely elliptic problem. Similar experiments on the alternative non-discretely elliptic method previously mentioned showed a significant increase in the number of iterations required as the mesh is refined.

Integration Within a Commercial Simulator

The finite volume method discussed in this specification has been implemented within a commercial reservoir simulator, i.e., the Eclipse simulator 46b shown in FIGS. 5, 6, and 7. A partly coupled moving mesh approach is used in which the flow equations are advanced to a report step and the resulting pore pressure and temperature are used as source terms in the stress tensor for a subsequent stress field calculation. The resulting stress is used to derive an updated porosity using the porosity-stress relation, and the flow simulation proceeds to the next report step. The same coupling approach has been used for the existing finite element geomechanics option (see Reference 3 below).

Figure 21:
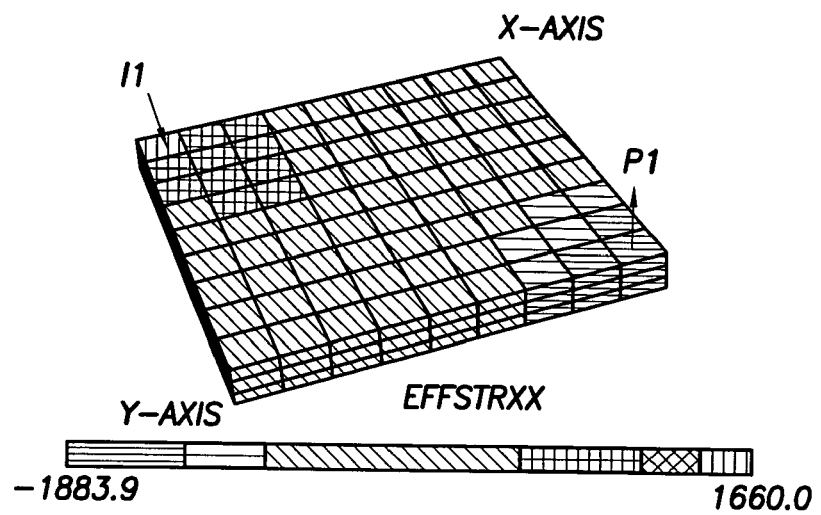
FIG. 21 illustrates effective stress term $\sigma_{xx}$ for Finite Volume Solution within commercial simulator.
Figure 22:
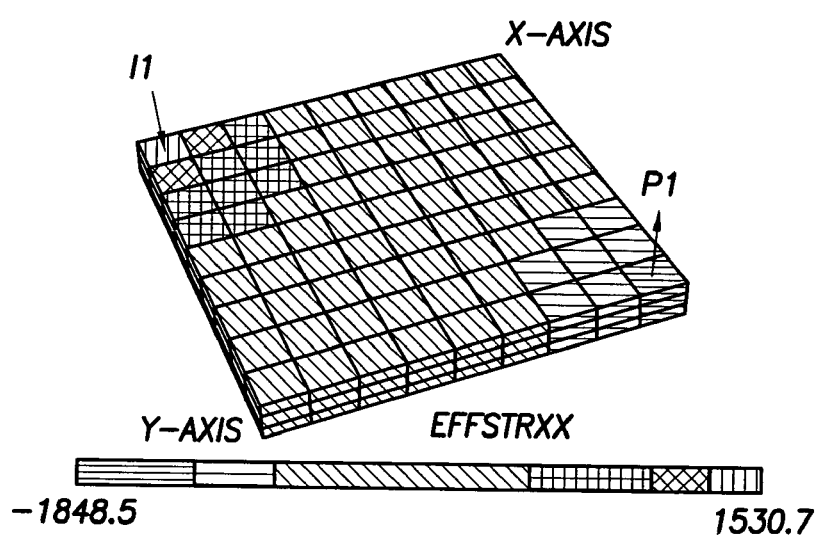
FIG. 22 illustrates effective stress term $\sigma_{xx}$ for Finite Volume Solution within commercial simulator.
Figure 23:
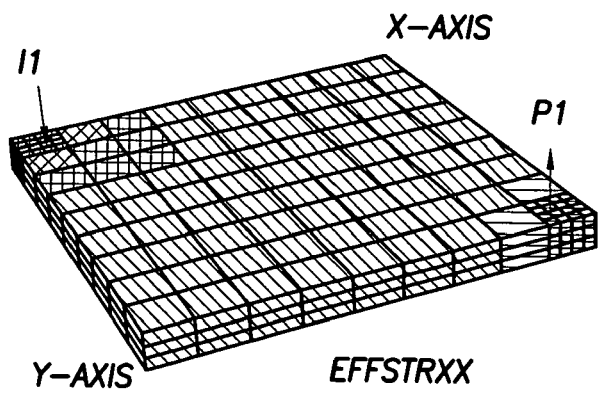
FIG. 23 illustrates effective stress term $\sigma_{xx}$ for Finite Volume Solution within commercial simulator with Local Grid Refinement around wells.

Refer now to FIGS. 21 and 22 and 23.

In FIGS. 21 and 22, results for finite volume and finite element discretisations for a simple test example run within the simulator are shown in FIG. 21 and FIG. 22. These show good qualitative and quantitative agreement. One difference is in the layering of the stress near the wells (which are not completed throughout the depth) in the finite volume case. This is under investigation. FIG. 23 shows a finite volume case including local grid refinements in the vicinity of the wells.

Comparing the two approaches, the main differences and similarities are as follows:

(1) The finite volume method has somewhat fewer independent variables, which are located with the flow variables, at grid-block centers, rather than grid nodes. This does not necessarily imply faster solution times, although it may simplify the process of coupling the flow and stress equations more implicitly.

(2) The finite volume method aims to handle all mesh features generically through its unstructured mesh formulation. The finite element approach currently implements pinch-outs, and local grid refinements are in the process of implementation. Faults are not yet included. However, there is an overhead in the generic nature of the finite volume approach. The cost of setting up the grid connectivities at the start of the simulation generally makes initialisation of the finite volume method slower than the finite element counterpart.

(3) The finite volume method is conservative. This means that the fluxes on any given interior face of the grid are computed in exactly the same way for each of the two cells that contain it. If the equations are integrated numerically over the entire domain the interior fluxes therefore cancel, and the result depends only on the boundary fluxes. This is a discrete analog of the divergence theorem.

(4) Inactive cells are not included in the finite volume model, but are included as dummy equations for finite elements.

(5) Both methods produce large sparse linear systems, which are solved by the multigrid solver SAMG. The solution times required are similar in both cases.

(6) Both methods retain good accuracy on general non-orthogonal meshes. The previous finite difference approach[1] did not have this important advantage.

A 'new Finite Volume Method for coupled Stress and Reservoir Flow Equations in three dimensions' has been presented. This method exhibits many desirable features, such as second-order accuracy on general unstructured meshes including meshes with faults, pinch-outs and local grid refinements.

The method has been shown to be discretely elliptic and therefore to produce solutions without unphysical oscillations and be suitable for efficient solution using multigrid methods. The convergence properties have been demonstrated by application to a sequence of model test problems with known solutions.

Nomenclature $\alpha$=Biot's constant, dimensionless $\alpha_T$=coefficient of linear thermal expansion, 1/° C., 1/° F.

$\lambda$=Lamé constant, bar, psi, Pa $\sigma$=normal stress, bar, psi, Pa $\mu$=Lamé constant (modulus of rigidity), bar, psi, Pa

REFERENCES

The following 'References', including References 1 through 11 set forth below, are each incorporated by reference into this specification:

1. Stone, T., Bowen, G., Papanastasiou, P. and Cook, J., "Coupled geomechanics in a commercial reservoir simulator", SPE 65107 presented at the SPE EUROPEC 2000 Petroleum Conference, October 2000.
2. Stone, T., Xian, C., Fang, Z., Manalac, E., Marsden, R., Fuller, J., "Coupled geomechanical simulation of stress dependent reservoirs", SPE 79697, presented at the SPE Reservoir Simulation Symposium, February 2003.
3. Liu, Q., Stone, T., Han, G., Marsden, R., Shaw, G., "Coupled stress and fluid flow using a finite element method in a commercial reservoir simulator", SPE 88616, presented at the SPE Asia Pacific Oil and Gas Conference in Perth, Australia, October 2004.
4. Peyret, R, and Taylor, T. D., *Computational methods for fluid flow*, Springer Verlag, Berlin, 1983.
5. Jameson, A., Schmidt, W. and Turkel, E., "Numerical solutions of the Euler equations by finite volume methods using Runge-Kutta time stepping", AIAA Paper 81-1259, 1981.
6. Crumpton, P. I. and Shaw, G. J., "Cell vertex finite volume discretizations in three dimensions", International. Journal for Numerical Methods in Fluids, vol 14, 505-527, 1992.
7. Rozon, B. J., "A generalized finite volume discretization method for reservoir simulation", paper SPE 18414 presented at the Reservoir Simulation Symposium held in Houston, Tex., Feb. 6-8, 1989.
8. Crumpton, P. I., Shaw, G. J. and Ware, A. F., "Discretization and multigrid solution of elliptic equations with mixed derivative terms and strongly discontinuous coefficients", Journal of Computational. Physics, vol 116, 343-358, 1995.
9. Demirdzic, I. and Muzaferija, S., "Finite volume method for stress analysis in complex domains", International Journal for Numerical Methods in Engineering, vol 37, 3751-3766, 1994.
10. Demirdzic, I. and Martinovic, D., "Finite volume method for thermo-elasto-plastic stress analysis", Computer Methods in Applied Mechanics and Engineering, vol 109, 331-349, 1993.
11. Stuben, K., *SAMG User's Manual Release* 21b1, Fraunhofer Institute SCAI, Schloss Birlinghoven, D-53754 St Augustin, Germany, July 2002.

The above description of the 'Finite Volume Method for Linear Elasticity' being thus described, it will be obvious that the same may be varied in many ways. Such variations are not to be regarded as a departure from the spirit and scope of the claimed method or apparatus or program storage device, and all such modifications as would be obvious to one skilled in the art are intended to be included within the scope of the following claims.

I claim:

1. A method for conducting a stress calculation adapted for modeling a set of stresses and displacements in a reservoir, comprising:

based at least in part on data indicative of measurements of the reservoir, building, using a processor, a reservoir model over a region of interest by gridding the region of interest, the grid being comprised of one or more cells and having grid nodes, each cell having a cell center, wherein each cell center is used to determine an approximation of displacements;

processing, using the processor, the reservoir model to interpolate unknown rock displacements in the region of interest from cell centers to the grid nodes, the interpolation of the unknown rock displacements comprising:

defining a linear function in a neighborhood of one of the grid nodes, and using the linear function to interpolate the approximation of displacements for each cell center in the neighborhood of the one of the grid nodes in the neighborhood to determine the unknown rock displacements of the one of the grid nodes, wherein the linear function is $\Phi = a + b(x-x_a) + c(y-y_a)$, wherein a, b, and c are unknown variables representing the unknown rock displacements, $x_a$ and $y_a$ represent coordinates, in two dimensions, of the one of the grid nodes, and x and y represent coordinates, in two dimensions, of each cell center in the neighborhood of the one of the grid nodes;

integrating, using the processor, a system of linear equations over each cell to form a discrete system of equations, wherein a number of equations in the system of linear equations is determined based on a number of the cell centers;

using the discrete system of equations to generate a model, using the processor, of the stresses and displacements in the reservoir; and displaying the model of the stresses and displacements in the reservoir.

2. The method of claim 1, wherein solving the system of linear equations comprises determining a least-squares solution of the system of linear equations.

3. The method of claim 1, wherein integrating over each cell to form a discrete system of equations comprises applying a divergence theorem.

4. The method of claim 3, wherein applying the divergence theorem further comprises approximating a set of line integrals using a mid-point rule.

5. A program storage device readable by a machine tangibly embodying a set of instructions executable by the machine to perform method steps for conducting a stress calculation adapted for modeling a set of stresses and displacements in a reservoir, said method steps comprising:

building a reservoir model over a region of interest by gridding the region of interest, the grid being comprised of one or more cells and having grid nodes, each cell having a cell center, wherein each cell center is used to determine an approximation of displacements;

interpolating unknown rock displacements in the region of interest from cell centers to the grid nodes, the interpolation of the unknown rock displacements comprising:

defining a linear function in a neighborhood of one of the grid nodes, and using the linear function to interpolate the approximation of displacements for each cell center in the neighborhood of the one of the grid nodes in the neighborhood to determine the unknown rock displacements of the one of the grid nodes, wherein the linear function is $\Phi = a + b(x - x_a) + c(y - y_a)$, wherein a, b, and c are unknown variables representing the unknown rock displacements, $x_a$ and $y_a$ represent coordinates, in two dimensions, of the one of the grid nodes, and x and y represent coordinates, in two dimensions, of a cell center of a cell in the neighborhood of the one of the grid nodes;

interpolating remaining cell centers in the neighborhood of grid node A;

integrating a system of linear equations over each cell to form a discrete system of equations, wherein a number of equations in the system of linear equations is determined based on a number of the cell centers;

using the discrete system of equations to generate a model of the stresses and displacements in the reservoir; and displaying the model of the stresses and displacements in the reservoir.

6. The program storage device of claim 5, wherein solving the system of linear equations comprises determining a least-squares solution of the system of linear equations.

7. The program storage device of claim 5, wherein integrating over each cell to form a discrete system of equations comprises applying a divergence theorem.

8. The program storage device of claim 7, wherein applying the divergence theorem further comprises approximating a set of line integrals using a mid-point rule.

9. A computer system adapted for conducting a stress calculation to model a set of stresses and displacements in a reservoir, comprising:

a processor; and a memory comprising software instructions, the software instructions when executed causing the processor to:

based at least in part on data indicative of measurements of the reservoir, build a reservoir model over a region of interest by gridding the region of interest, the grid being comprised of one or more cells and having grid nodes, each cell having a cell center, wherein each cell center is used to determine an approximation of displacements;

process the model to interpolate interpolating unknown rock displacements in the region of interest from cell centers to grid nodes, the interpolation of the unknown rock displacements comprising:

defining a linear function in a neighborhood of one of the grid nodes, and using the linear function to interpolate the approximation of displacements for each cell center in the neighborhood of the one of the grid nodes in the neighborhood to determine the unknown rock displacements of the one of the grid nodes, wherein the linear function is $\Phi = a + b(x - x_a) + c(y - y_a)$, wherein a, b, and c are unknown variables representing the unknown rock displacements, $x_a$ and $y_a$ represent coordinates, in two dimensions, of the one of the grid nodes, and x and y represent coordinates, in two dimensions, of a cell center of a cell in the neighborhood of the one of the grid nodes;

interpolate remaining cell centers in the neighborhood of grid node A;

integrate a system of linear equations over each cell to form a discrete system of equations, wherein a number of equations in the system of linear equations is determined based on a number of the cell centers;

generate a model of the reservoir while using the discrete system of equations to model the stresses and displacements in said reservoir; and display the model of the reservoir.

10. The computer system of claim 9, wherein the software instructions further cause the processor to determine a least-squares solution of the system of linear equations.

11. The computer system of claim 9, wherein the software instructions further cause the processor to apply a divergence theorem.

12. The computer system of claim 11, wherein the software instructions further cause the processor to approximate a set of line integrals using a mid-point.

13. A computer readable medium adapted to be executed by a processor, said computer readable medium, when executed by said processor, practicing a process adapted for conducting a stress calculation to model a set of stresses and displacements in a reservoir, the process comprising:

building a reservoir model over a region of interest by gridding the region of interest, the grid being comprised of one or more cells and having grid nodes, each cell having a cell center, wherein each cell center is used to determine an approximation of displacements;

interpolating unknown rock displacements in the region of interest from cell centers to grid nodes, the interpolation of the unknown rock displacements comprising:

defining a linear function in a neighborhood of one of the grid nodes, and using the linear function to interpolate the approximation of displacements for each cell center in the neighborhood of the one of the grid nodes in the neighborhood to determine the unknown rock displacements of the one of the grid node, wherein the linear function is $\Phi = a + b(x-x_a) + c(y-y_a)$, wherein a, b, and c are unknown variables representing the unknown rock displacements, $x_a$ and $y_a$ represent coordinates, in two dimensions, of the one of the grid nodes, and x and y represent coordinates, in two dimensions, of a cell center of a cell in the neighborhood of the one of the grid nodes;

interpolate remaining cell centers in the neighborhood of grid node A;

integrating a system of linear equations over each cell to form a discrete system of equations, wherein a number of equations in the system of linear equations is determined based on a number of the cell centers;

using the discrete system of equations to generate a model of the stresses and displacements in the reservoir; and displaying the model of the stresses and displacements in the reservoir.

14. The computer readable medium of claim 13, wherein solving the system of linear equations comprises determining a least-squares solution of the system of linear equations.

15. The computer readable medium of claim 13, wherein integrating over each cell to form a discrete system of equations comprises applying a divergence theorem.

16. The computer readable medium of claim 15, wherein applying the divergence theorem further comprises approximating a set of line integrals using a mid-point rule.

* * * * *